(12) United States Patent
Kersten

(10) Patent No.: US 8,157,028 B2
(45) Date of Patent: Apr. 17, 2012

(54) MASONRY DRILL BIT

(75) Inventor: Heinrich Kersten, Verden (DE)

(73) Assignee: Illinois Tool Works Inc., Glenview, IL (US)

( * ) Notice: Subject to any disclaimer, the term of this patent is extended or adjusted under 35 U.S.C. 154(b) by 347 days.

(21) Appl. No.: 12/279,734

(22) PCT Filed: Mar. 1, 2007

(86) PCT No.: PCT/US2007/005212
§ 371 (c)(1),
(2), (4) Date: Aug. 18, 2008

(87) PCT Pub. No.: WO2007/103093
PCT Pub. Date: Sep. 13, 2007

(65) Prior Publication Data
US 2010/0183391 A1  Jul. 22, 2010

(30) Foreign Application Priority Data
Mar. 3, 2006 (DE) .................. 20 2006 003 539 U

(51) Int. Cl.
*E21B 10/40* (2006.01)

(52) U.S. Cl. ..................................... 175/427; 175/428
(58) Field of Classification Search .................. 175/401, 175/415, 425, 437, 323, 419, 420, 427, 428
See application file for complete search history.

(56) References Cited

U.S. PATENT DOCUMENTS

| 6,021,857 | A  | * | 2/2000 | Birk et al. ..................... 175/415 |
| 6,371,702 | B1 | * | 4/2002 | DeWald et al. ............... 408/227 |
| 6,446,741 | B1 | * | 9/2002 | Kersten et al. ................ 175/428 |
| 6,550,555 | B2 | * | 4/2003 | Huber et al. .................. 175/415 |
| 6,629,805 | B1 |   | 10/2003 | Eischeid |
| 6,702,047 | B2 |   | 3/2004 | Huber |

FOREIGN PATENT DOCUMENTS

| DE | 29819388 U1 | 9/1999 |
| DE | 19944406 A1 | 5/2001 |
| EP | 1029622 A2  | 8/2000 |
| GB | 2318072     | 4/1998 |

OTHER PUBLICATIONS

ISR for PCT/US2007/005212 dated Aug. 31, 2007.

* cited by examiner

*Primary Examiner* — Brad Harcourt
(74) *Attorney, Agent, or Firm* — Lowe Hauptman Ham & Berner LLP

(57) ABSTRACT

A masonry drill bit includes a cutting insert which is substantially roof-shaped in sideview and has on each side of its "roof" one lip. Each lip includes a leading cutting surface and a trailing free surface, wherein the mutually abutting free surfaces at the roof ridge define a chisel edge. Each free surface is concave in a sub-zone adjacent to the chisel edge in a manner that the radially outer ends of the chisel edge axially protrude at the end face of the insert relative to the in-between center of the chisel edge. Each lip includes at least one recess and to that extent deviates from the substantially roof-shaped geometry.

18 Claims, 3 Drawing Sheets

MASONRY DRILL BIT

RELATED APPLICATIONS

The present application is based on International Application Number PCT/US2007/005212 filed Mar. 1, 2007, and claims priority from German Application Number 20 2006 003 539.7 filed Mar. 3, 2006, the disclosures of which are hereby incorporated by reference herein in their entirety.

TECHNICAL FIELD

The disclosure relates to a masonry drill bit, where "drill bit" denotes the elongated tool inserted into chucks, in particular used in conjunction with a percussion or hammer apparatus.

BACKGROUND

Such masonry drill bits in particular are suitable for concrete or reinforced concrete, further for other masonry, rocks or the like. Especially high performance is required of such drill bits when drilling metal-reinforced concrete. The cutting geometry of the masonry drill bit precludes "controlled" chipping the reinforcement such as is carried out by metal cutting tools. Instead severing the reinforcement must be tried at an appropriate drill bit speed and the highest possible applied pressure. This procedure accordingly is a mixture of chipping and plastic deformation. The masonry drill bit therefore is highly loaded.

Substantial design criteria for the masonry drill bits being discussed here are simple centering, the attainable drilling rate (advance per unit time), long service life and lastly wear.

A known masonry drill bit (EP 0 761 927 B1) is fitted with a stamped hard metal point. In this manner and using a small contact area between the drill bit and the material being drilled, a predetermined pressure will result in high thrust. Such a shape also allows good centering. On the other hand, and in particular when drilling reinforced concrete, the said metal point must be expected to break off. Accordingly high thrust and good centering are traded against high wear.

Another masonry drill bit (EP 1 029 622 A2) also is fitted with a hard metal point which however is somewhat "countersunk" axially into the bit. In this manner the hard metal tip also is supported effectively in the drill bit and wear is reduced.

Both masonry drill bits discussed above incur the drawback that the chisel edge present at the center of rotation does not cut away in this zone. Consequently the "dead" zone of the masonry drill bit impedes the drilling advance.

A much different approach to eliminate the above impediment to drilling advance is disclosed in relation to a further known masonry drill bit in DE 199 44 406 C2. Essentially the drill bit of the last reference is fitted with a substantially roof-shaped insert. Lips run on both sides of the insert and are constituted by a leading lip and a trailing free surface. In this design, the radially outer ends of the chisel edge project axially at the end face of the insert relative to the in-between center of the chisel edge. In other words, the design might be termed being "an indented chisel edge". This shall be the meaning of the expression in the discussion below.

SUMMARY

Surprisingly centering the above known masonry drill bit with an indented chisel edge is exceedingly good. Because the drill bit is free from any impeding edge at its center, this known masonry drill bit offers an advantageous drilling rate.

The present disclosure's object is to so design and further refine the known masonry drill bit that drilling advance may be raised further yet in particular with respect to reinforced materials.

In an aspect, the invention takes into account that when an axial thrust is applied to the drill bit and hence to the insert, said thrust is transmitted by a contact area, that is essentially by the lips, to the material being drilled. The thrust transmitted by the contact area foremost depends on the lips' geometry.

The thrust transmitted through the contact surface is a substantial factor affecting the drilling advance rate. This is especially the case when drilling reinforced concrete, as already mentioned above.

In another aspect, the present invention offers the insight that a predetermined thrust function across the contact area may be attained by an appropriate configuration and design of recesses in the lips. In general the thrust is increased by reducing the contact area. It was found that this feature jointly with the indented chisel edge considerably increases the centering effect and simultaneously enhances the drilling advance rate especially when drilling reinforced materials.

In a further aspect, the present invention allows attaining all the advantages of a hard-metal point, namely good centering and high thrust while the drawbacks of such a point, namely the high wear and the "dead" central zone, are effectively averted.

A single recess per lip is used in an embodiment, said recess when viewed in the longitudinal lip direction being configured substantially at the center of said lip. This design allows substantially universal applicability of the masonry drill bit.

A further embodiment allows increasing the drill bit mechanical strength and/or stability. On the whole, the offset defined in this embodiment also reduces the tendency to vibrate during drilling.

In other embodiments considerable significance attaches to the design of the insert's free surface. Another embodiment offers especially high lip mechanical strength and/or stability.

DETAILED DESCRIPTION

Figure 1:
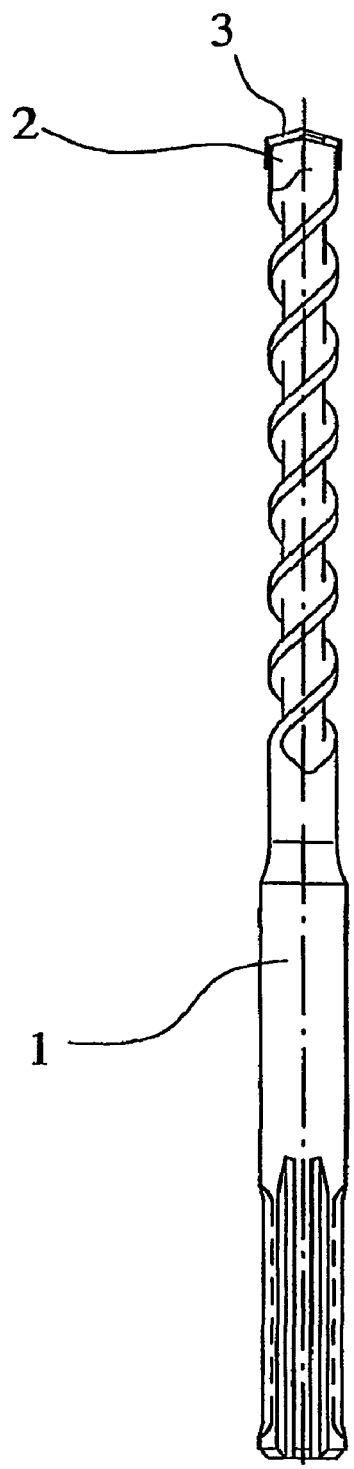
FIG. 1 is a sideview of an illustrative embodiment of the a masonry drill bit of the invention.

The masonry drill bit shown in the drawings comprises a shank 1 (FIG. 1) and a drill bit head 2 on said shank. The shank 1 and the drill bit head 2 need not mandatory be integral. However in general they are integral for problem-free force transmission from the former to the latter.

FIGS. 1 through 4 illustrate a masonry drill bit fitted with a cutting insert 3 in accordance with the first embodiment of the present invention. As will be explained in greater detail herein, FIG. 5 illustrates the second embodiment of the cutting insert 3. Alternatively, although not shown, the masonry drill bit may be fitted with more than one cutting insert 3.

Figure 2:
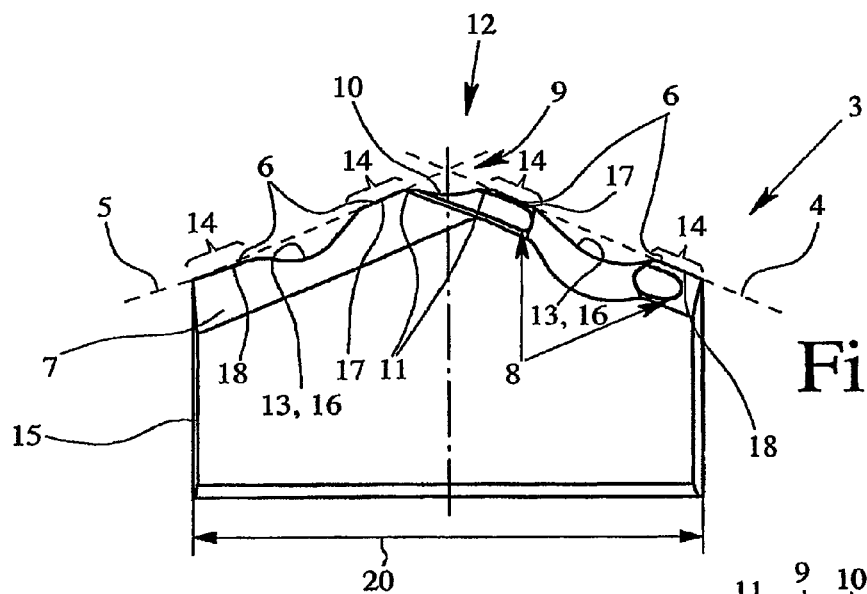
FIG. 2 is a sideview of the insert of the masonry drilling bit of FIG. 1.

Inspection of FIGS. 2 and 5 shows that the insert 3 is substantially roof-shaped when seen in sideview. In other words, when seen in sideview, the insert 3 runs along two conceptual intersecting lines 4, 5. This configuration is attained in that the insert 3 comprises on each side of said "roof" one lip 6 constituted by a leading cutting surface 7 and a trailing free surface 8. Seen in sideview, the lips 6 run essentially along the virtual lines 4, 5. Obviously, when seen in topview, (FIG. 4), the lips 6 deviate from the virtual lines 4, 5.

The free surfaces 8 joining at the roof ridge 9 define a chisel edge or transverse blade 10. The adjoining free surfaces 8 are concave in a sub-zone 8a adjacent to the chisel edge 10 in a manner that the radially outer ends 11 of the chisel edge 10 project axially at the end face 12 of the insert 3 relative to the in-between center of the chisel edge 10.

Accordingly the chisel edge 10 herein is not part of drill bit point. On the contrary, it is a chisel edge indented into a predetermined shape as already discussed in the above introduction. The chisel edge 10 might be fitted with an edge or be rounded as a whole. In the latter case the chisel edge 10 assumes a subordinate cutting function.

So far the above description corresponds to the masonry drill bit disclosed in the German patent document DE 199 44 406 C2. The contents of this patent document which is owned by the present applicant, is incorporated by reference herein in its entirety. This applies in particular to the indented chisel edge and to the related preferred dimensions.

As best seen in FIG. 5, each lip 6 of the cutting insert 3 comprises at least one recess 13 dimensioned and configured to deviate from the substantially roof-shaped tip. That is, the lips 6 deviate from the virtual lines 4 and 5.

FIG. 2 indicates that, during drilling, it is the portions 14 of the lip 6 that are primarily acting on the material being drilled. Obviously some power is also transmitted to a lesser extent by means of the recesses 13. This lesser power is due to the fact that the material being drilled breaks off to some extent in this region. If there were ideal positive locking between drill and material, said secondary power of course would be significant. But this is not the case here.

Accordingly the power is substantially transmitted by means of a comparatively small contact surface into the material being drilled, and thrust is commensurately high. This feature is especially advantageous when drilling reinforced materials.

Many variations are applicable for the recesses 13 in the lips 6.

As best seen in FIG. 2, the lips 6 are each fitted with one recess 13 which is configured and positioned substantially at the middle of the lip in a longitudinal direction. However, the recess 13 may also be configured and positioned in the upper third of the lip away from the outer edge 15 of the insert 3. Alternatively, the recess 13 also may be configured in the lower third of the lip 6 facing the outer edge 15 of the insert 3.

It may be advantageous that the lips 6 each shall be fitted with several, but not limited to, two recesses 13 evenly, or any other desired spaced apart relation, distributed over the length of the particular lip 6 for large drill diameters.

The shown illustrative embodiments, which are preferred to some extent, offer the feature that the recess 13 in one of the lips 6 is designed and configured in symmetrical manner about the drill bit axis relative to the recess in the other lip 6. Such a symmetrical configuration of the recesses 13 is advantageous especially as regards quiet/smooth drilling operation.

In very special cases, in particular percussion drilling, it might also be advantageous to design and configure the recesses asymmetrically.

FIGS. 2 and 5 indicate that the recesses 13 of the lips 6 are edge-shaped and moreover that the resulting edge 16 merges into the lip 6. Accordingly the edge 16 of the recess 13 in a way extends the lip 6. This transition may be implemented by means of a rounded zone, that is devoid of bend(s). Basically, however, the transition may include a bend.

The recesses 13 of the lips 6 in the first and the second embodiments illustrated in FIGS. 1 through 5 are substantially concave. In other words, the recesses bulge toward the drill bit's inside. The recesses 13 of the lips are preferably configured to be curvilinear, or in the alternative, at least partly circularly arcuate. Such curvilinear configuration without bends provides for a better mechanical strength and/or stability.

Regarding manufacture, it may be advantageous that the recesses 13 of the lips 6 shall consist of rectilinear segments joined to each other at bend sites. This feature moreover may be combined with the above curvilinear design.

Figure 3:
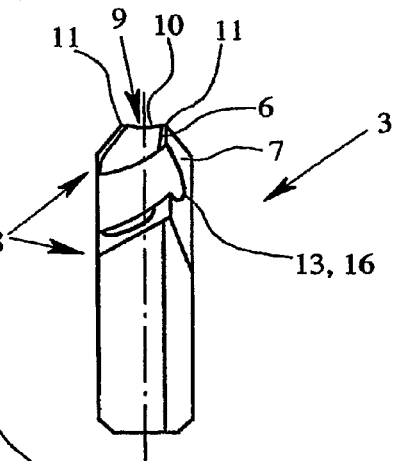
FIG. 3 is a front view of the insert of the masonry drill bit of FIG. 1.
Figure 4:
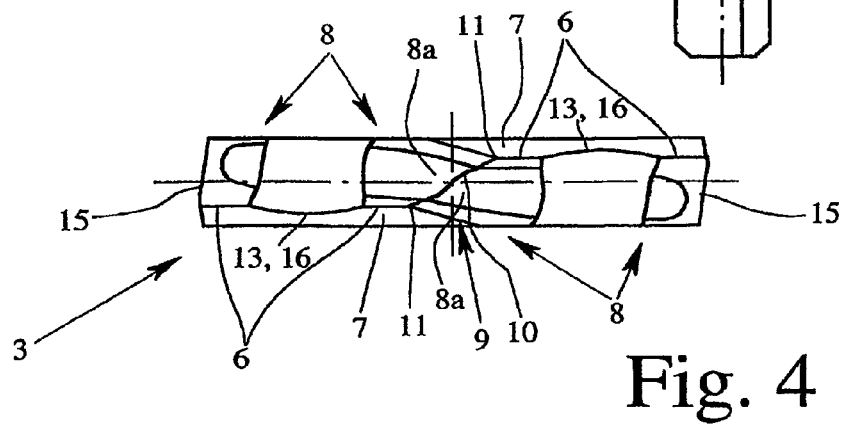
FIG. 4 is a topview of the insert of the masonry drill bit of FIG. 1.
Figure 5:
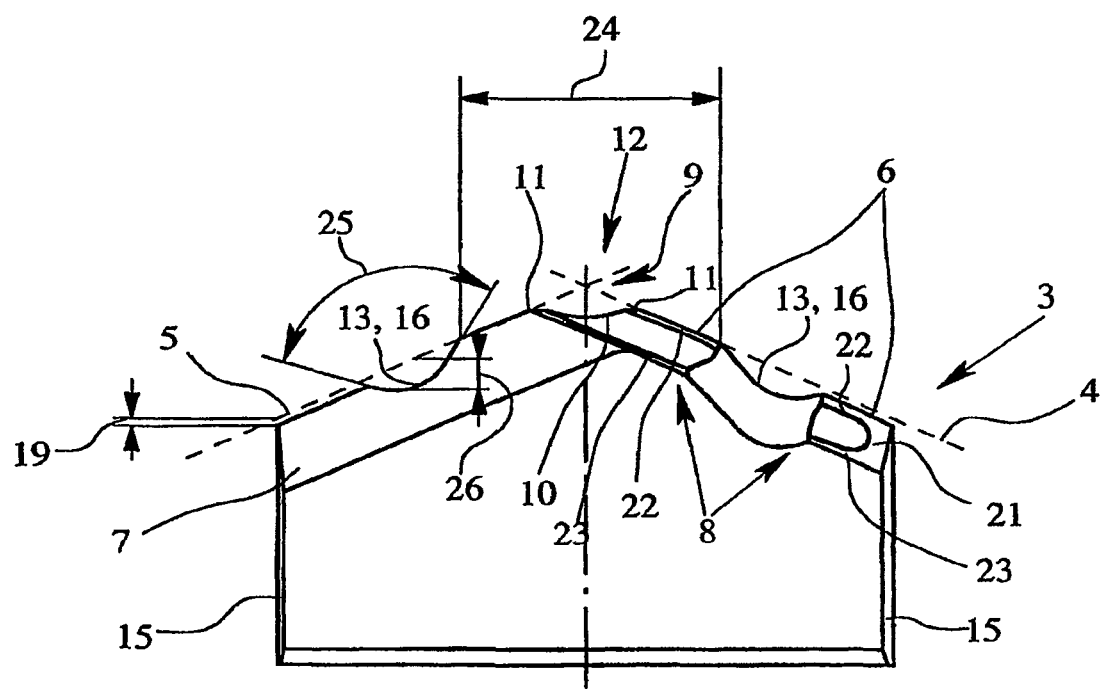
FIG. 5 is a sideview of a further embodiment mode of the masonry drill bit of the invention.

By considering FIGS. 2, 3 and 4 together, it follows that the recesses 13 of the lips 6 are constituted in the corresponding free surfaces 8, said recesses running over the full width of these free surfaces 8, that is from top to bottom in FIG. 4.

The recess 13 in the particular lip 6 allows reducing the effective length of the lip 6. "Length of the lip 6" means the one which determines the contact surface between the drill bit and the material being drilled. Relative to a design lacking a recess 13, a reduction of about 30 to 60%, preferably about 40%, is used in an embodiment of the invention.

Illustratively if the effective length of the particular lip 6 is reduced by about 40%, the theoretical thrust applied by the remaining, effective length of said lip on the material being drilled is increased—neglecting the power transfer from the recesses 13—by about the factor of 5/3. This factor may be arbitrarily set by appropriately designing the recesses 13.

The embodiment of FIG. 5 differs of that shown in FIGS. 2-4 in that the two segments 17, 18 adjoining the recess 13 of the particular lip 6 are slightly axially offset but parallel and in that the lips 6 to this extent do additionally deviate from the insert 3. Preferably said axial offset 19 is selected in a manner that the inner segments 17 of the lips 6 correspondingly project slightly axially above the outer segments 18 of the lips 6. This feature offers mechanical drill bit strength and/or stability and improved drill bit handling during drilling.

As regards a drill bit diameter 20 in a range from about 12 mm to about 20 mm, the magnitude of the axial offset 19 falls in a range approximately between 0.45 mm and 0.57 mm. It was noted that regarding a drill bit diameter 20 of about 16 mm, an axial offset 19 of about 0.48 mm was highly advantageous.

The design of the free surface 8 is especially significant in accordance with some embodiments of the present invention. The design of the free surface 8 determines on one hand the indented chisel edge 10 and on the other hand the minimum of one recess 13 in the particular lip 6.

The sub-zone 8a of the free surface and adjacent to the chisel edge 10 is configured as an ellipsoidal arc when seen in cross-section. Alternatively, the sub-zone 8a may be configured as a circular arc Correspondingly, the chisel edge also shall be an ellipsoidal or circular arc. These design variations increase mechanical drill bit strength and/or stability in the region of the chisel edge 10.

In an embodiment, the concave sub-zone 8a of the particular free surface 8, adjacent to the chisel edge 10 runs radially along the free surface 8, optionally in discontinuous manner, through the minimum of one recess 13 in the lip 6.

The drawing furthermore indicates that as regards the shown embodiments a plane surface 21 adjoins radially the concave sub-zone 8a of the particular free surface 8. Moreover a further planar surface 22 adjoins the concave sub-zone 8a of the particular free surface 8 on the side situated toward the lip 6. Additionally or alternatively, a planar surface 23 may adjoin the concave sub-zone 8a of the particular free surface 8 on the side away from the lip 6. Such design(s) is (are) shown in the appended Figures and are preferred to that extent. Said planar surfaces 21, 22, 23 offer the advantageous feature of very substantially raising the mechanical strength and/or stability of the insert 3. This is especially the case for the planar surface 22 which increases the strength and/or stability of the lip 6.

It may be advantageous in some applications when several sub-zones 8a are separated from each preferably by planar surfaces and are present in the free surfaces 8. In that case the free surfaces 8 each are made concave in at least one further sub-zone 8 outside the region of at least one recess 13 of the particular lip 6. Preferably a planar surface 21, 22, 23 adjoins the side of this sub-zone 8a on the side situated toward the particular lip 6. As above, a design comprising several sub-zones 8a may offer advantages of mechanical strength and/or stability enhancement.

Lastly mention should be made of an embodiment of the masonry drill bit of the invention that was found empirically to be especially advantageous. The following dimensions relate to a drill bit diameter 20 of about 16 mm. Where the diameters 20 are larger or smaller, the stated magnitudes should be commensurately modified:

The internal segments 17 of the two lips 6 considered together exhibit a width 24 of about 5.7 mm. The aperture angle 25 of the recesses 13 preferable is in the range between 80 and 100°. A preferred value of the aperture angle 25 is 90°. The depth of the recesses 13 of the lips 6 when measured in the axial direction is about 1.5 mm. This is the axial distance between the lowest site of the particular recess 13 and the virtual line 4, 5.

The invention claimed is:

1. A masonry drill bit, comprising:
   a cutting insert having a substantially roof-shaped configuration in sideview and comprises on each side thereof one lip further comprising a leading cutting surface and a trailing free surface, wherein the free surfaces at a ridge of the roof define a chisel edge, each said free surface being concave in a sub-zone adjacent to the chisel edge in a manner that the radially outer ends of the chisel edge axially protrude at the end face of the insert relative to the in-between center of the chisel edge,
   wherein each lip comprises at least one recess and to that extent deviates from the substantially roof-shaped configuration, and two segments of the lip adjoining the at least one recess are configured in axially parallel, and offset to each other in a direction substantially parallel to a longitudinal axis of said drill bit, and in that the lips to this extent deviate further from the roof-like shape, and
   wherein at least one of the two segments comprises an upper planar surface on said trailing free surface and bounding said concave sub-zone, and said upper planar surface extending away from said at least one recess.

2. Masonry drill bit as claimed in claim 1, wherein each lip is fitted with a single recess when seen in the longitudinal direction of the lip being essentially configured at the middle of the lip, or the recess is configured in the upper third of the lip away from the outer edge of the insert.

3. Masonry drill bit as claimed in claim 1, wherein each lip comprises two recesses being evenly distributed over the length of the lip.

4. Masonry drill bit as claimed in claim 1, with respect to the drill bit axis wherein at least one recess of one of the lips is designed and configured to be symmetrical about at least one recess of the other lip.

5. Masonry drill bit as claimed in claim 1, wherein at least one recess of the lip is edge-like and in that the resulting edge moreover merges into the lip by means of a rounded region.

6. Masonry drill bit as claimed in claim 1, wherein the minimum of one recess of the lip is substantially concave.

7. Masonry drill bit as claimed in claim 1, wherein the minimum of one recess of the lip assumes a curvilinear shape.

8. Masonry drill bit as claimed in claim 1, wherein the minimum of one recess of the lip is constituted by a recess in the corresponding free surface and in that said recess runs across the full width of the free surface.

9. Masonry drill bit as claimed in claim 1, wherein the sub-zone of the free surface adjacent to the chisel edge is an ellipsoidal arc.

10. Masonry drill bit as claimed in claim 1, wherein the sub-zone of the free surface adjacent to the chisel edge is a circular arc.

11. Masonry drill bit as claimed in claim 1, wherein the concave sub-zone of the free surface situated adjacent to the chisel edge runs in the radial direction and interrupted by the minimum of one recess in the lip.

12. Masonry drill bit as claimed in claim 1, wherein a planar surface radially adjoins the concave sub-zone of the particular free surface.

13. Masonry drill bit as claimed in claim 1, wherein a planar surface adjoins the concave sub-zone of the particular free surface on the side facing the lip.

14. Masonry drill bit as claimed in claim 1, wherein the free surfaces at least in a further sub-zone outside a region of the minimum of one recess of the particular lip each are concave and that the side of this sub-zone situated toward the particular lip is adjoined by a planar surface.

15. A masonry drill bit, comprising:
    a cutting insert having a substantially roof-shaped configuration in sideview and comprises on each side thereof one lip further comprising a leading cutting surface and a trailing free surface, wherein the free surfaces at a ridge of the roof define a chisel edge, each said free surface being concave in a sub-zone adjacent to the chisel edge in a manner that the radially outer ends of the chisel edge axially protrude at the end face of the insert relative to the in-between center of the chisel edge,
    wherein each lip comprises at least one recess and to that extent deviates from the substantially roof-shaped configuration, and two segments of the lip adjoining the at least one recess are configured in axially parallel, and offset to each other in a direction substantially parallel to a longitudinal axis of said drill bit, and in that the lips to this extent deviate further from the roof-like shape, and
    wherein the effective length of the lip is reduced by the recess in the lip by about 30 to about 60% as compared to a configuration devoid of a recess.

16. A masonry drill bit, comprising:
    a cutting insert having a substantially roof-shaped configuration in sideview and comprises on each side thereof one lip further comprising a leading cutting surface and a trailing free surface, wherein the free surfaces at a ridge of the roof define a chisel edge, each said free surface being concave in a sub-zone adjacent to the chisel edge in a manner that the radially outer ends of the chisel edge axially protrude at the end face of the insert relative to the in-between center of the chisel edge, wherein each lip comprises at least one recess and to that extent deviates from the substantially roof-shaped configuration, and two segments of the lip adjoining the at least one recess are configured in axially parallel, and offset to each other in a direction substantially parallel to a longitudinal axis of said drill bit, and in that the lips to this extent deviate further from the roof-like shape, and wherein the inner segments of the lips correspondingly slightly project axially above the outer segments of the lips, in that the magnitude of the axial offset is approximately in a range between 0.45 mm and 0.57 mm for a drill bit diameter in a range between about 12 mm and about 20 mm.

17. Masonry drill bit as claimed in claim 16, wherein for a drill bit diameter of about 16 mm, the magnitude of the axial offset is about 0.48 mm.

18. A masonry drill bit, comprising:

a cutting insert having a substantially roof-shaped configuration in sideview and comprises on each side thereof one lip further comprising a leading cutting surface and a trailing free surface, wherein the free surfaces at a ridge of the roof define a chisel edge, each said free surface being concave in a sub-zone adjacent to the chisel edge in a manner that the radially outer ends of the chisel edge axially protrude at the end face of the insert relative to the in-between center of the chisel edge, wherein each lip comprises at least one recess and to that extent deviates from the substantially roof-shaped configuration, and two segments of the lip adjoining the at least one recess are configured in axially parallel, and offset to each other in a direction substantially parallel to a longitudinal axis of said drill bit, and in that the lips to this extent deviate further from the roof-like shape, and wherein the effective length of the particular lip is reduced by the recess in the lip by about 40% as compared to a configuration devoid of a recess.

* * * * *